W. R. WALLINGSFORD.
FOLDING CAR STEP.
APPLICATION FILED DEC. 10, 1918.
1,350,903.
Patented Aug. 24, 1920.
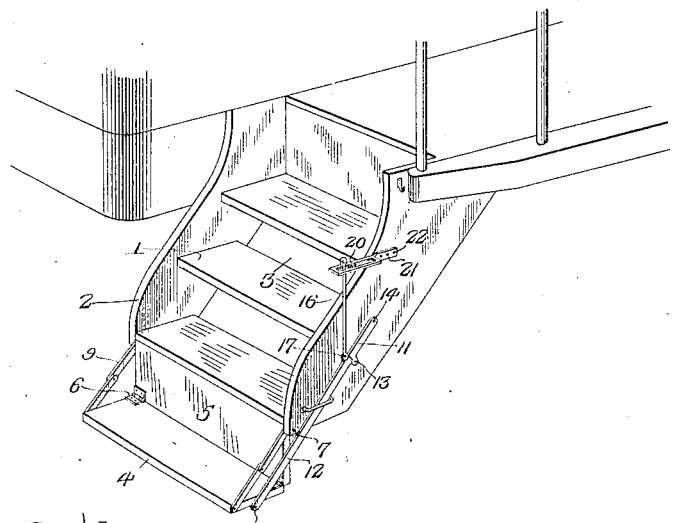
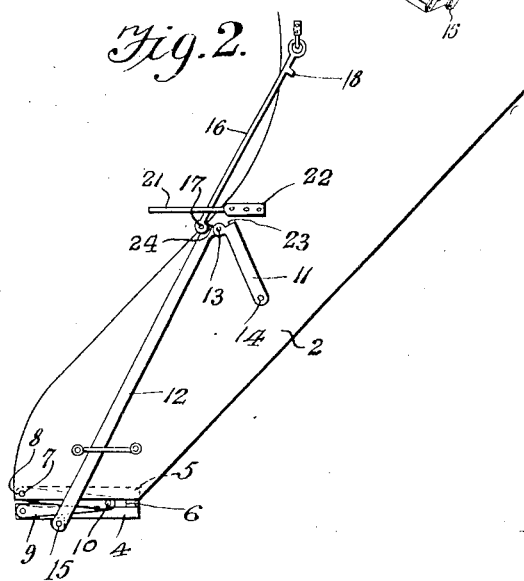
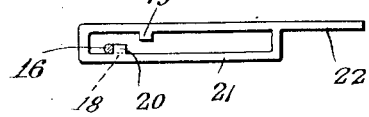
Inventor
W. R. Wallingsford,
By Victor J. Evans
Attorney
Witnesses
J. H. Crawford

UNITED STATES PATENT OFFICE.

WILLIAM R. WALLINGSFORD, OF TINSMAN, ARKANSAS.

FOLDING CAR-STEP.

1,350,903.  Specification of Letters Patent.  Patented Aug. 24, 1920.

Application filed December 10, 1918. Serial No. 266,077.

*To all whom it may concern:*

Be it known that I, WILLIAM R. WALLINGSFORD, a citizen of the United States, residing at Tinsman, in the county of Calhoun and State of Arkansas, have invented new and useful Improvements in Folding Car-Steps, of which the following is a specification.

This invention relates to folding or extensible car steps, the broad object in view being to provide in connection with the ordinary stationary or fixed step of a car, an auxiliary foldable or collapsible extension step and riser, said foldable step and riser being so mounted with relation to the fixed step structure and brace that such extension or foldable step will be held rigidly in its useful position.

A further object of the invention is to provide in connection with such foldable or collapsible extension step, operating means embodying a novel arrangement of toggle levers which have an automatic self locking connection with each other as the foldable step is moved toward its extended position, the operating means also providing for breaking such connection during the folding operation of the step.

With the above and other objects in view the invention consists in the novel construction, combination and arrangement, of parts herein fully described, illustrated and claimed.

In the accompanying drawings:—

Figure 1 is a perspective view showing the improved structure in its applied relation to a car, Fig. 2 is a fragmentary side elevation of the same showing the foldable or extension step folded, Fig. 3 is a plan view of the combined guide and keeper.

Referring to the drawings, the fixed step structure is of the usual formation, comprising the fixed tread 1, the tread support 2 and the risers 3, said structure being fastened to the car in the ordinary way and in the usual position as shown in Fig. 1.

Adapted to be positioned at a lower elevation than the bottom step of the fixed structure is a foldable or collapsible step tread 4 and also a foldable riser 5 extending from the rear edge of the tread 4 upwardly to or adjacent to the forward or projecting edge of the lower-most fixed step or tread. The tread 4 is connected to the riser 5 by means of a plurality of strong hinges 6. The riser 5 is connected fixedly to a horizontal rock shaft 7 the end portions of which are journaled in openings 8 in the support 2 hereinabove referred to. This forms a strong connection between the riser and the fixed or rigid step structure while the hinges 6 form an efficient and strong pivotal connection between the foldable step or tread and its riser 5. Toggle suspension links 9 connect the outer extremity of the step 4 with the rock shaft 7, said toggle links being pivotally connected to said parts and being connected together by pivots 10.

The foldable part of the structure hereinabove referred to is controlled by a pair of toggle levers 11 and 12 which are pivotally connected together at 13. The upper toggle lever 11 is connected by a pivot 14 to a fixed part of the step structure, while the lower toggle lever 12 is connected by means of a pivot 15 to the foldable step or tread 4. The toggle levers 11 and 12 extend along one side of one of the supports 2 and are operated by means of a rod 16 which is connected by pivot 17 to one of said toggle levers. The operating rod 16 is provided with a stop shoulder or lug 18 adapted to be brought into engagement with one or more corresponding stop shoulders 19 and 20 on a combined guide and keeper 21 secured fixedly at 22 to a fixed part of the structure. When the folding step or tread is extended or moved to its useful position, the lug or shoulder 18 is engaged under one of the shoulders 19 and 20, thereby preventing upward movement of the pivot 17 and consequently preventing the toggle levers from collapsing or swinging upwardly. It will be noted that the pivot 13 is arranged conisderably to one side of an imaginary line passing through the pivots 14 and 15 while the pivot 17 is arranged at the opposite side of said line. It will also be noted that the levers 11 and 12 are provided with abutting shoulders 23 and 24 which lie in contact with each other when said levers 11 and 12 are in longitudinal alinement with each other. The construction referred to permits said levers to swing or fold in one direction but prevents them from swinging or collapsing in the opposite direction and the construction and arrangement described also renders said toggle levers self locking and bracing when in their positions shown in Fig. 1. The mechanism above described is of such a character that it may be made strong and durable, with no small or delicate parts to break or get out of order. By means of the invention herein described the use of the ordinary footstool is eliminated.

I claim:—

A folding car step structure comprising the combination with the lower fixed tread and the side supports of car steps, of a rock shaft journaled transversely of the lower ends of said side supports, a folding riser rigidly secured at its upper edge to said rock shaft, a folding tread hingedly connected with the lower edge of said riser, toggle suspension links at each side of the steps and connecting said folding tread and rock shaft, an upwardly inclined lever pivotally connected at its lower end with said tread, a second lever pivotally connected at one end with one of said side supports and having an upwardly breaking knee joint connection with the upper end of the first named lever, an upwardly extending operating rod pivotally connected with the upper end of said first named lever and having its upper end provided with an extension and a handle, and a combined guide and keeper having a stop shoulder beneath which the extension on said rod is adapted to engage to lock the folding step structure in its position of use, said rod being movable upwardly whereby to break said knee joint.

In testimony whereof I affix my signature.

WILLIAM R. WALLINGSFORD.